US012374786B2

(12) United States Patent
Sano

(10) Patent No.: US 12,374,786 B2
(45) Date of Patent: Jul. 29, 2025

(54) ELECTRONIC CIRCUITRY

(71) Applicants: KABUSHIKI KAISHA TOSHIBA, Tokyo (JP); Toshiba Energy Systems & Solutions Corporation, Kawasaki (JP)

(72) Inventor: Makoto Sano, Tokyo (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 223 days.

(21) Appl. No.: 18/179,957

(22) Filed: Mar. 7, 2023

(65) Prior Publication Data

US 2023/0402747 A1 Dec. 14, 2023

(30) Foreign Application Priority Data

Jun. 10, 2022 (JP) ................................ 2022-094722

(51) Int. Cl.
*H01Q 1/52* (2006.01)
*H01Q 21/00* (2006.01)

(52) U.S. Cl.
CPC ............ *H01Q 1/521* (2013.01); *H01Q 21/00* (2013.01)

(58) Field of Classification Search
CPC .............................. H01Q 1/521; H01Q 21/00
See application file for complete search history.

(56) References Cited

U.S. PATENT DOCUMENTS

2014/0118214 A1* 5/2014 Tanaka .................. H01Q 1/521 343/852
2014/0159986 A1* 6/2014 De Luis ................. H01Q 1/521 343/852
2019/0115662 A1* 4/2019 Sakita .................... H01Q 1/243

FOREIGN PATENT DOCUMENTS

JP 5099159 B2 12/2012
JP 5871647 B2 3/2016
WO WO-2013/175903 A1 11/2013

OTHER PUBLICATIONS

J. Coetzee et al., "Closed-form design equations for decoupling networks of small arrays", Electronics Letter, vol. 44, No. 25, pp. 1441-1442, Dec. 2008.
K. Nishimoto et al., "Decoupling Networks Composed of Lumped Elements for Diversity/MIMO Antennas", 2013 IEEE-APS Topical Conference on Antennas and Propagation in Wireless Communications (APWC), Turin, Italy, pp. 307-310, 2013.

* cited by examiner

*Primary Examiner* — Daniel D Chang
(74) *Attorney, Agent, or Firm* — Foley & Lardner LLP

(57) ABSTRACT

According to one embodiment, electronic circuitry, includes a first radiating element; a second radiating element; a first circuit element including a first end and a second end, the first end being connected to one end of one of the first radiating element or the second radiating element; and a second circuit element connected between the second end of the first circuit element and one end of another of the first radiating element or the second radiating element.

17 Claims, 13 Drawing Sheets

ELECTRONIC CIRCUITRY

CROSS REFERENCE TO RELATED APPLICATIONS

This application is based upon and claims the benefit of priority from the prior Japanese Patent Application No. 2022-094722, filed on Jun. 10, 2022, the entire contents of which are incorporated herein by reference.

FIELD

Embodiments described herein relate to electronic circuitry.

BACKGROUND

Wireless devices including a plurality of antennas as radiating elements suffer from a problem that realized gains of the antennas are reduced due to large electromagnetic coupling among the antennas. As a decoupling circuit reducing coupling between antennas, a configuration to reduce electromagnetic coupling between two antennas by using three circuit elements is known.

In this configuration, it is necessary to adjust the three circuit elements. Therefore, complicated work is necessary to adjust the circuit elements. For example, in a case where chip components are used as the circuit elements, adjustment work of replacing three chip components while measuring the electromagnetic coupling between the antennas is necessary. In addition, a manufacturing cost is increased.

DETAILED DESCRIPTION

According to one embodiment, electronic circuitry, includes a first radiating element; a second radiating element; a first circuit element including a first end and a second end, the first end being connected to one end of one of the first radiating element or the second radiating element; and a second circuit element connected between the second end of the first circuit element and one end of another of the first radiating element or the second radiating element.

Some embodiments are described below with reference to drawings.

First Embodiment

Figure 1:
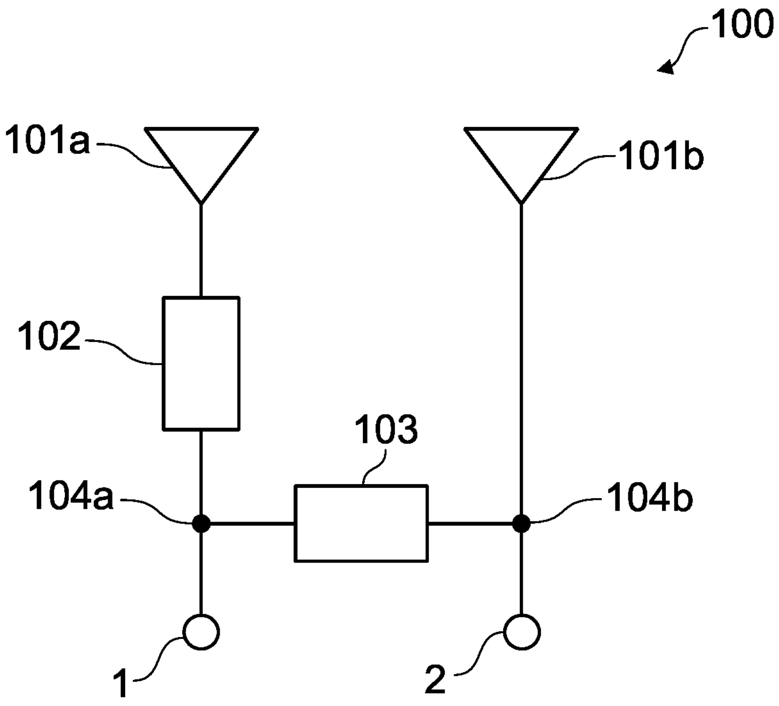
FIG. 1 is a diagram illustrating a configuration example of a decoupling circuit as electronic circuitry according to a first embodiment.

FIG. 1 is a diagram illustrating a configuration of a decoupling circuit 100 as electronic circuitry according to a first embodiment. The decoupling circuit 100 relates to a technique that reduces electromagnetic coupling (hereinafter, referred to as coupling) between two radiating elements (antennas) 101*a* and 101*b*.

The decoupling circuit 100 includes a first radiating element 101*a*, a second radiating element 101*b*, a circuit element 102 (first circuit element), and a circuit element 103 (second circuit element). The circuit element 102 is an element to be mainly adjusted in reactance as a circuit constant (circuit parameter), and is also referred to as a reactance element 102. The circuit element 103 is an element to be mainly adjusted in susceptance as a circuit constant (circuit parameter), and is also referred to as a susceptance element 103 hereinafter.

Each of the first radiating element 101*a* and the second radiating element 101*b* is an antenna that transmits, as electromagnetic waves, a high-frequency signal that is a radio signal to a space, or outputs, as a high-frequency signal, electromagnetic waves received from the space.

Examples of each of the first radiating element 101*a* and the second radiating element 101*b* include a dipole antenna, a monopole antenna, an inverted-L antenna, an inverted-F antenna, a patch antenna, a slot antenna, a notch antenna, and a dielectric resonator antenna. The type of each antenna is not limited as long as each antenna can transmit/receive the high-frequency signal.

The first radiating element 101*a* and the second radiating element 101*b* may be antennas having the same configuration, or may be antennas having different configurations.

Further, each of the first radiating element 101*a* and the second radiating element 101*b* may be an antenna operating at a single frequency, or may be an antenna operating in a plurality of frequency bands.

The first radiating element 101*a* and the second radiating element 101*b* may not be matched in an operation frequency band. Each of the first radiating element 101*a* and the second radiating element 101*b* may be an antenna operating at a single frequency, or may be an antenna operating in a plurality of frequency bands.

The first radiating element 101*a* and the second radiating element 101*b* may be antennas that transmit/receive the high-frequency signal in the same polarization, or may be antennas that transmit/receive the high-frequency signals in different polarizations.

The first radiating element 101*a* and the second radiating element 101*b* may be in any position and direction. For example, the positions and the directions are determined so as to reduce a correlation coefficient of radiation patterns of the first radiating element 101*a* and the second radiating element 101*b*, which makes it possible to improve communication quality and the like.

An end (first end) of the reactance element 102 is connected to one end of the radiating element 101*a*. One end of the susceptance element 103 is connected to the other end (second end) of the reactance element 102, and the other end of the susceptance element 103 is connected to one end of the radiating element 101*b*. The susceptance element 103 is connected between the other end (second end) of the reactance element 102 and the one end of the radiating element 101*b*.

The reactance element 102 is positioned between a connection point 104*a* between the susceptance element 103 and the reactance element 102, and the radiating element 101*a*. The other end of the reactance element 102 is connected to a port 1 receiving/outputting a signal from/to a wireless circuit (see FIG. 13 and FIG. 14). For example, the connection point 104*a* is a node in a line connecting the other end of the reactance element 102 to the port 1.

The one end of the radiating element 101*b* is connected to a port 2 receiving/outputting a signal from/to the wireless circuit. A connection point 104*b* (node) between the radiating element 101*b* and the susceptance element 103 is positioned between the one end of the radiating element 101*b* and the port 2. For example, the connection point 104*b* is a node in a line connecting the one end of the radiating element 101*b* to the port 2.

FIG. 2 illustrates configuration examples of each of the reactance element 102 and the susceptance element 103.

Figure 2A:
FIGS. 2A to 2D each is a diagram illustrating configuration examples of a reactance element and a susceptance element.

As illustrated in FIG. 2A, each of the reactance element 102 and the susceptance element 103 may be configured by an inductor.

Figure 2B:
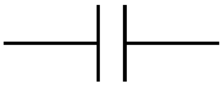

As illustrated in FIG. 2B, each of the reactance element 102 and the susceptance element 103 may be configured by a capacitor.

Figure 2C:
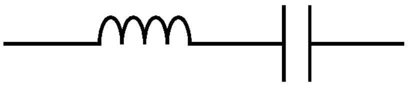

As illustrated in FIG. 2C, each of the reactance element 102 and the susceptance element 103 may be configured by an inductor and a capacitor connected in series.

Figure 2D:
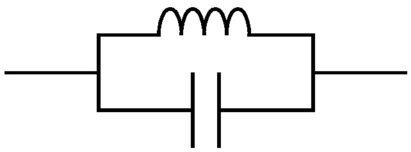

As illustrated in FIG. 2D, each of the reactance element 102 and the susceptance element 103 may be configured by an inductor and a capacitor connected in parallel.

The reactance element 102 and the susceptance element 103 may have the same configuration or different configurations. For example, both of the reactance element 102 and the susceptance element 103 may be inductors. One of the reactance element 102 or the susceptance element 103 is an inductor, and the other may be a capacitor.

In the decoupling circuit 100 in FIG. 1, the reactance of the reactance element 102 and the susceptance of the susceptance element 103 are appropriately adjusted. This makes it possible to reduce coupling between the first radiating element 101*a* and the second radiating element 101*b*. In the present embodiment, it is necessary to adjust only two circuit elements in order to reduce coupling. Therefore, adjustment work is easily performable.

Further, when a single inductor or a single capacitor is used as each of the circuit elements as illustrated in FIG. 2A or FIG. 2B, the work to adjust the reactance of the reactance element 102 and the susceptance of the susceptance element 103 is facilitated. In addition, a manufacturing cost can be reduced.

When a configuration in which an inductor and a capacitor are connected in series or in parallel is used as each of the circuit elements as illustrated in FIG. 2C or FIG. 2D, coupling between the first radiating element 101*a* and the second radiating element 101*b* can be reduced in a plurality of frequency bands.

The inductor or the capacitor illustrated in FIG. 2A to FIG. 2D may include a parasitic inductor, a parasitic capacitor, and an internal resistance.

In a case where the reactance element 102 and the susceptance element 103 are the inductors, a chip component such as a chip inductor or a lead inductor may be used. Further, each of the inductors may be configured by forming a conductor pattern of a substrate in a meandering shape, a spiral shape, or the like. Each of the inductors may be configured using a via of the substrate. Further, a stub may be used as each of the inductors. Each of the inductors may be any of a fixed inductor and a variable inductor.

In a case where the reactance element 102 and the susceptance element 103 are capacitors, a chip component such as a chip capacitor or a lead capacitor may be used. A gap between two conductor patterns formed on the substrate may be used as a capacitor, as with an interdigital capacitor or the like. A metal-insulator-metal (MIM) capacitor configured by a conductor pattern and a base material of the substrate may be used. The capacitor may be any of a fixed capacitor and a variable capacitor. A varactor diode may be used as the variable capacitor.

Figure 3:
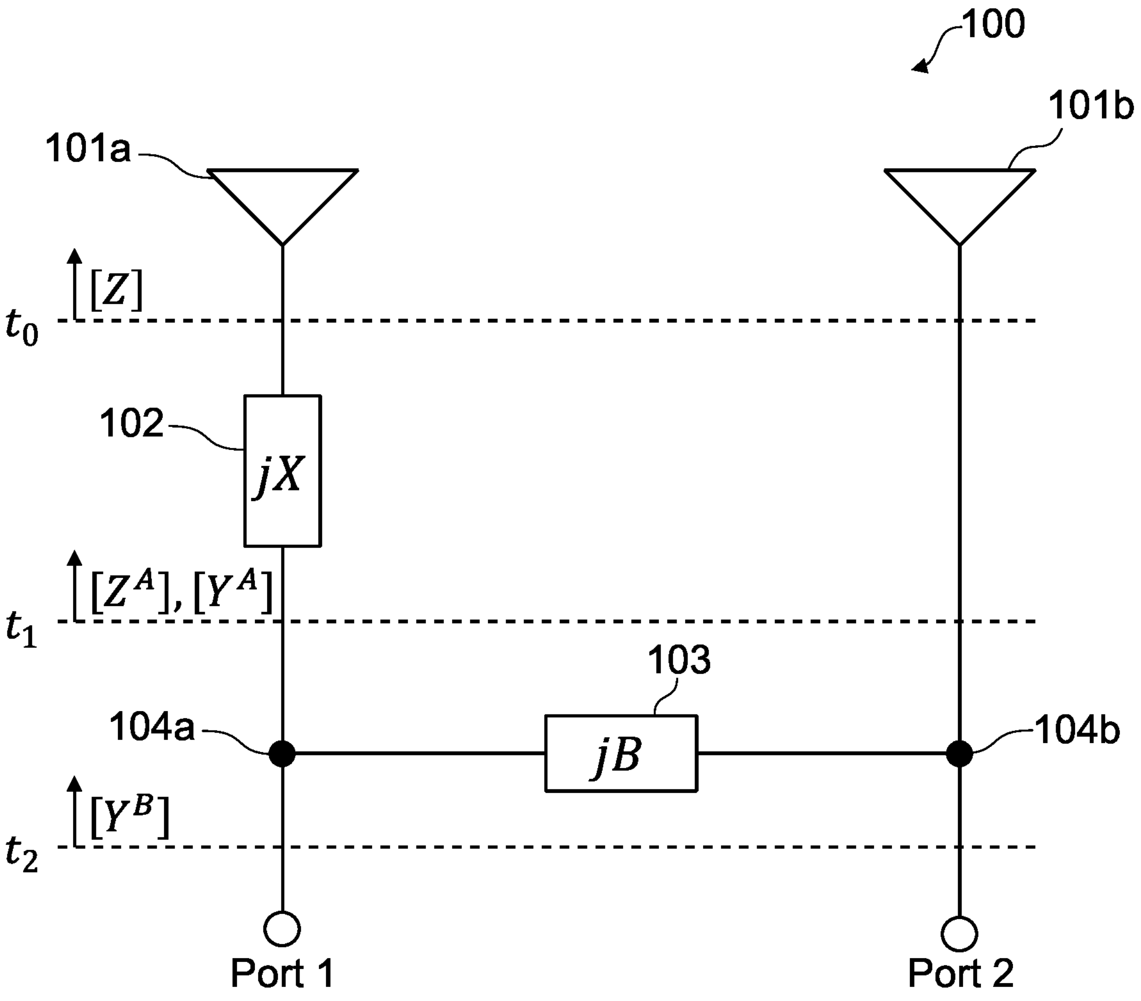
FIG. 3 is a diagram to explain an example of determining circuit constants of the reactance element and the susceptance element.

FIG. 3 is a diagram to explain an example of determining the reactance of the reactance element 102 and the susceptance of the susceptance element 103 to reduce coupling between the first radiating element 101*a* and the second radiating element 101*b*. In the following, an example of deriving the reactance of the reactance element 102 and the susceptance of the susceptance element 103 by using expressions is described with reference to FIG. 3.

As illustrated in FIG. 3, the reactance of the reactance element 102 is denoted by "X", and the susceptance of the susceptance element is denoted by "B". Further, an impedance matrix of the first radiating element 101*a* and the second radiating element 101*b* as viewed from a to surface in FIG. 3 is represented by the following expression (1). The impedance matrix represents antenna characteristics of the first radiating element 101*a* and the second radiating element 101*b*.

[Expression 1]

$$[Z] = \begin{bmatrix} Z_{11} & Z_{12} \\ Z_{21} & Z_{22} \end{bmatrix} = \begin{bmatrix} R_{11} + jX_{11} & R_{12} + jX_{12} \\ R_{21} + jX_{21} & R_{22} + jX_{22} \end{bmatrix} \quad (1)$$

In the expression, "$Z_{11}$" is an input impedance of the first radiating element 101*a*, "$Z_{22}$" is an input impedance of the second radiating element 101*b*, and "$Z_{21}$" and "$Z_{12}$" are mutual impedances between the first radiating element 101*a* and the second radiating element 101*b* and are the same value. Further, "$Z_{11}$", "$Z_{12}$", "$Z_{21}$", and "$Z_{22}$" are complex numbers, "$R_{11}$", "$R_{12}$", "$R_{21}$", and "$R_{22}$" are real parts, and "$X_{11}$", "$X_{12}$", "$X_{21}$", and "$X_{22}$" are imaginary parts. The impedance matrix in the expression (1) is an impedance matrix in a case where it is assumed that nothing is connected to the first radiating element 101*a* and the second radiating element 101*b*.

An impedance matrix as viewed from a $t_1$ surface including the first radiating element 101*a*, the second radiating element 101*b*, and the reactance element 102 is represented by the following expression (2). In the expression, "$Z_{11}+jX$" is an input impedance of the first radiating element 101*a* including the reactance element 102, and "X" is the reactance of the reactance element 102.

[Expression 2]

$$[Z^A] = \begin{bmatrix} Z_{11}+jX & Z_{12} \\ Z_{21} & Z_{22} \end{bmatrix} \quad (2)$$

Further, an admittance matrix is represented by the following expression (3).

[Expression 3]

$$[Y^A] = [Z^A]^{-1} = \frac{1}{(Z_{11}+jX)Z_{22} - Z_{12}Z_{21}} \begin{bmatrix} Z_{22} & -Z_{12} \\ -Z_{21} & Z_{11}+jX \end{bmatrix} \quad (3)$$

An admittance matrix as viewed from a $t_2$ surface including the susceptance element 103 is represented by the following expression (4). The admittance matrix of the expression (4) represents entire characteristics including all of the first radiating element 101*a*, the second radiating element 101*b*, the reactance element 102, and the susceptance element 103. Further, "B" is the susceptance of the susceptance element 103.

[Expression 4]

$$[Y^B] = [Y^A] + \begin{bmatrix} jB & -jB \\ -jB & jB \end{bmatrix} = \begin{bmatrix} Y_{11}^B & Y_{12}^B \\ Y_{21}^B & Y_{22}^B \end{bmatrix} \quad (4)$$

When $Y_{12}^B$ that is (1, 2) component of $[Y^B]$ is zero, the high-frequency signal input from the port 1 is not output to the port 2. In other words, coupling between the first radiating element 101*a* and the second radiating element 101*b* is eliminated.

Accordingly, the reactance of the reactance element 102 is adjusted to the reactance "X" represented by the following expression (5), derived from $Y_{12}^B=0$, and the susceptance of the susceptance element 103 is adjusted to the susceptance "B" represented by the expression (6). This makes it possible to eliminate or reduce coupling between the first radiating element 101*a* and the second radiating element 101*b*. In the expression (6), "Inn" represents an imaginary part of a complex number in brackets. Further, $Y_{12}^B=0$ is achievable at a plurality of frequencies f. Accordingly, coupling between the first radiating element 101*a* and the second radiating element 101*b* can be eliminated or reduced in a plurality of frequency bands or in a broad frequency band.

[Expression 5]

$$X = \frac{-(R_{12}^2 + X_{12}^2)R_{21} + (R_{11}R_{12} + X_{11}X_{12})R_{22} + (R_{11}X_{12} - X_{11}R_{12})X_{22}}{R_{12}X_{22} + X_{12}R_{22}} \quad (5)$$

[Expression 6]

$$B = \mathrm{Im}\left[\frac{-Z_{12}}{(Z_{11}+jX)Z_{22} - Z_{12}Z_{21}}\right] \quad (6)$$

The reactance "X" of the reactance element 102 and the susceptance "B" of the susceptance element 103 do not necessarily have to be equal to the value derived from the expression (5) and the value derived from the expression (6), respectively. When the reactance "X" of the reactance element 102 and the susceptance "B" of the susceptance element 103 are respectively substantially close to the value derived from the expression (5) and the value derived from the expression (6), coupling between the first radiating element 101*a* and the second radiating element 101*b* is sufficiently reduced. For example, in fact, when the reactance "X" of the reactance element 102 and the susceptance "B" of the susceptance element 103 are respectively shifted from the value derived from the expression (5) and the value derived from the expression (6) due to influence by solder, wirings, or the like of the circuit, coupling between the radiating elements can be further reduced in some cases. The value close to the value derived from the expression (5) and the value close to the value derived from the expression (6) may be selected from E series circuit constants (standard sequence). The reactance "X" of the reactance element 102 and the susceptance "B" of the susceptance element 103 may be deviated from the value derived from the expression (5) and the value derived from the expression (6), respectively, due to tolerances of the circuit constants, manufacturing errors, or the like.

The susceptance and the reactance are in a reciprocal relationship. Therefore, adjustment of the reactance of the circuit element 102 (reactance element 102) can be replaced with adjustment of a susceptance of the circuit element 102. Likewise, adjustment of the susceptance of the circuit element 103 (susceptance element 103) can be replaced with adjustment of a reactance of the circuit element 103.

Figure 4:
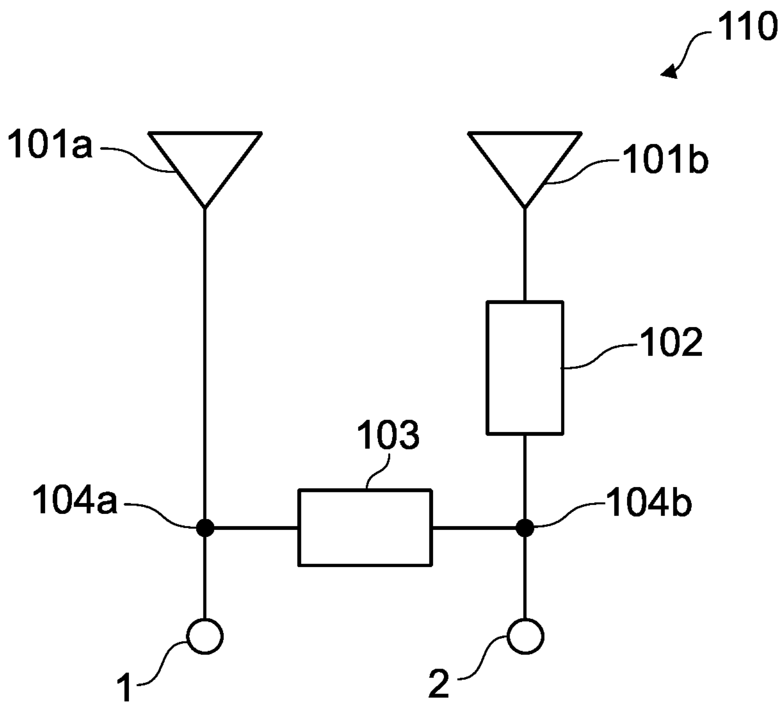
FIG. 4 is a diagram illustrating another configuration example of the decoupling circuit according to the first embodiment.

FIG. 4 is a diagram illustrating a decoupling circuit 110 modified from the decoupling circuit 100 in FIG. 1.

In the decoupling circuit 110, the reactance element 102 is connected between the second radiating element 101*b* and the second connection point 104*b*. When the reactance "X" of the reactance element 102 and the susceptance "B" of the susceptance element 103 respectively have a value represented by the following expression (7) and a value represented by the following expression (8), coupling between the first radiating element 101*a* and the second radiating element 101*b* can be made zero.

[Expression 7]

$$X = \frac{-(R_{21}^2 + X_{21}^2)R_{12} + (R_{22}R_{21} + X_{22}X_{21})R_{11} + (R_{22}X_{21} - X_{22}R_{21})X_{11}}{R_{21}X_{11} + X_{21}R_{11}} \quad (7)$$

[Expression 8]

$$B = \mathrm{Im}\left[\frac{-Z_{21}}{(Z_{22}+jX)Z_{11} - Z_{21}Z_{12}}\right] \quad (8)$$

As in the decoupling circuit 100 in FIG. 1, the reactance "X" of the reactance element 102 and the susceptance "B" of the susceptance element 103 do not necessarily have to be equal to the value derived from the expression (7) and the value derived from the expression (8), respectively. When the reactance "X" of the reactance element 102 and the susceptance "B" of the susceptance element 103 are respectively substantially close to the value derived from the expression (7) and the value derived from the expression (8), coupling between the first radiating element 101*a* and the second radiating element 101*b* can be sufficiently reduced.

Figure 5:
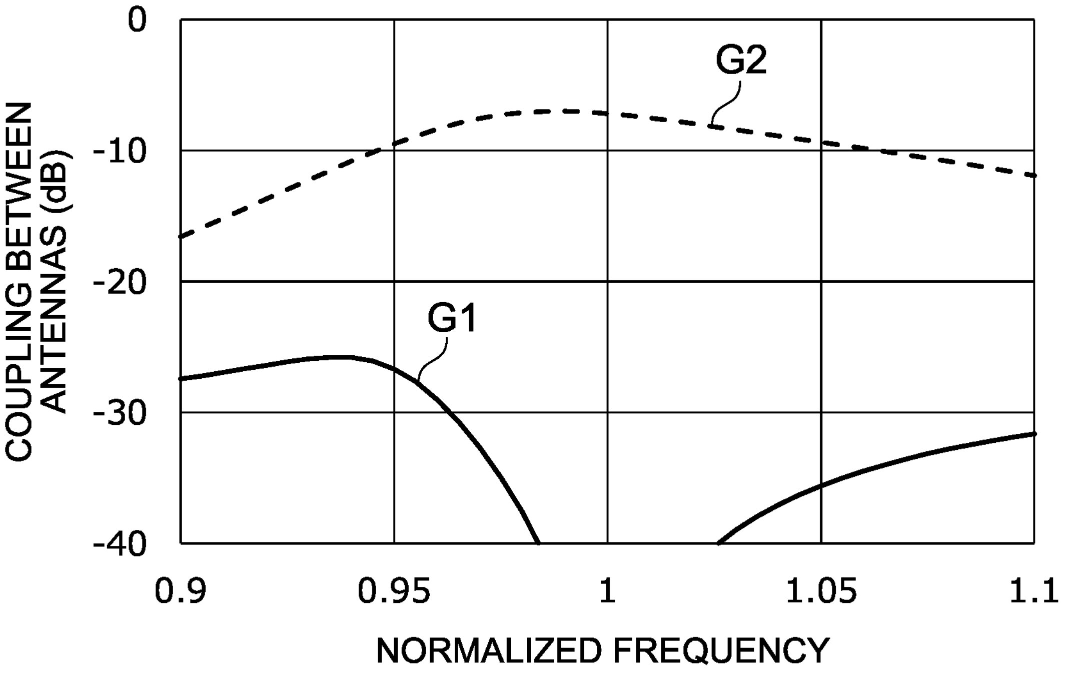
FIG. 5 is a diagram illustrating frequency characteristics of coupling between antennas of the decoupling circuit according to the first embodiment.

FIG. 5 illustrates a solid-line graph G1 representing frequency characteristics of coupling between the antennas in the decoupling circuit 100 in FIG. 1, and a dashed-line graph G2 representing frequency characteristics of coupling between antennas in a configuration (comparative example) in which the reactance element 102 and the susceptance element 103 are removed from the decoupling circuit 100 in FIG. 1.

More specifically, the solid-line graph G1 represents coupling between the antennas as viewed from the first connection point 104*a* and the second connection point 104*b* in a case where, at a center frequency of the operation frequency band, the value derived from the expression (5) is applied as the reactance "X" to the reactance element 102 and the value derived from the expression (6) is applied as the susceptance "B" to the susceptance element 103. The dashed-line graph G2 represents coupling between the antennas in a case where the reactance element 102 is not connected to directly connect the first radiating element 101*a* and the first connection point 104*a*, and the susceptance element 103 is not connected to disconnect the first connection point 104*a* and the second connection point 104*b*.

As illustrated by the graph G2, in the case where the reactance element 102 and the susceptance element 103 are not connected, coupling between the antennas is large at the center frequency and is −7 dB. In contrast, as illustrated by the graph G1, in the case where the reactance element 102 and the susceptance element 103 are connected, it is possible to reduce coupling between the antennas to −40 dB or less.

Figure 6:
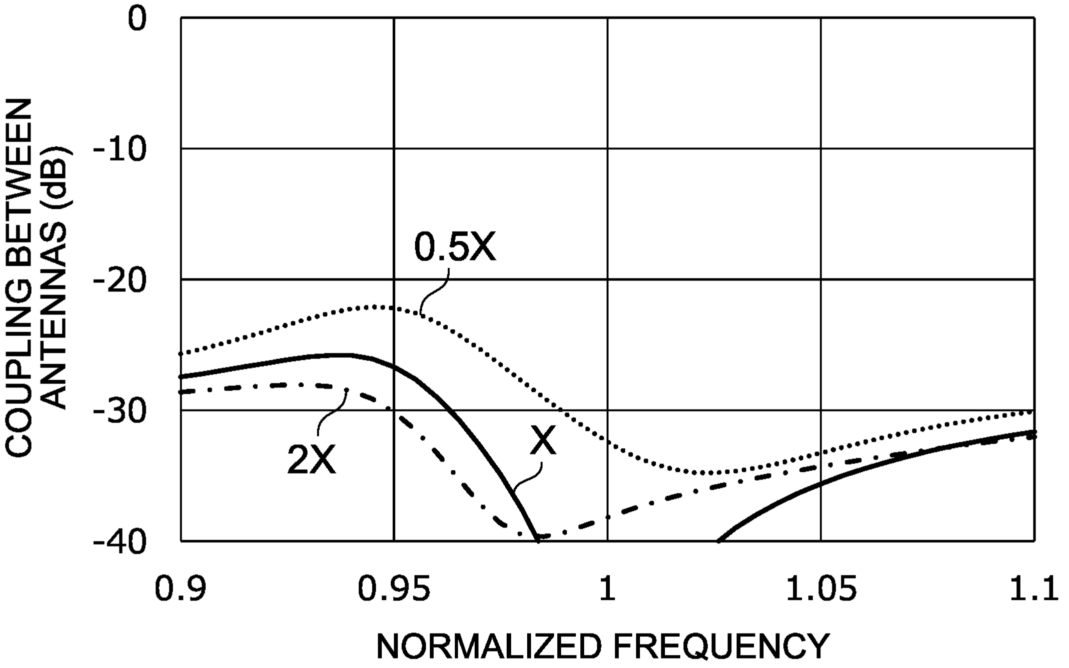
FIG. 6 is a diagram illustrating the frequency characteristics of coupling between the antennas when a reactance of the reactance element of the decoupling circuit according to the first embodiment is changed.

FIG. 6 is a diagram to explain frequency characteristics of coupling between the antennas in a case where the reactance "X" of the reactance element 102 is changed from the value derived from the expression (5), in the decoupling circuit 100 in FIG. 1. As the susceptance "B" of the susceptance element 103, the value derived from the expression (6) is used.

A graph X represents frequency characteristics in a case where the value derived from the expression (5) is used as the reactance "X" of the reactance element 102. A graph 0.5× represents frequency characteristics in a case where a value that is 0.5 times of the value derived from the expression (5) is used as the reactance "X" of the reactance element 102. A graph 2× represents frequency characteristics in a case where a value that is two times of the value derived from the expression (5) is used as the reactance "X" of the reactance element 102. As illustrated in FIG. 6, even in the case where the value that is 0.5 times or two times of the reactance "X" derived from the expression (5) is used, coupling between the antennas at the center frequency is small, namely, −32 dB or less.

Figure 7:
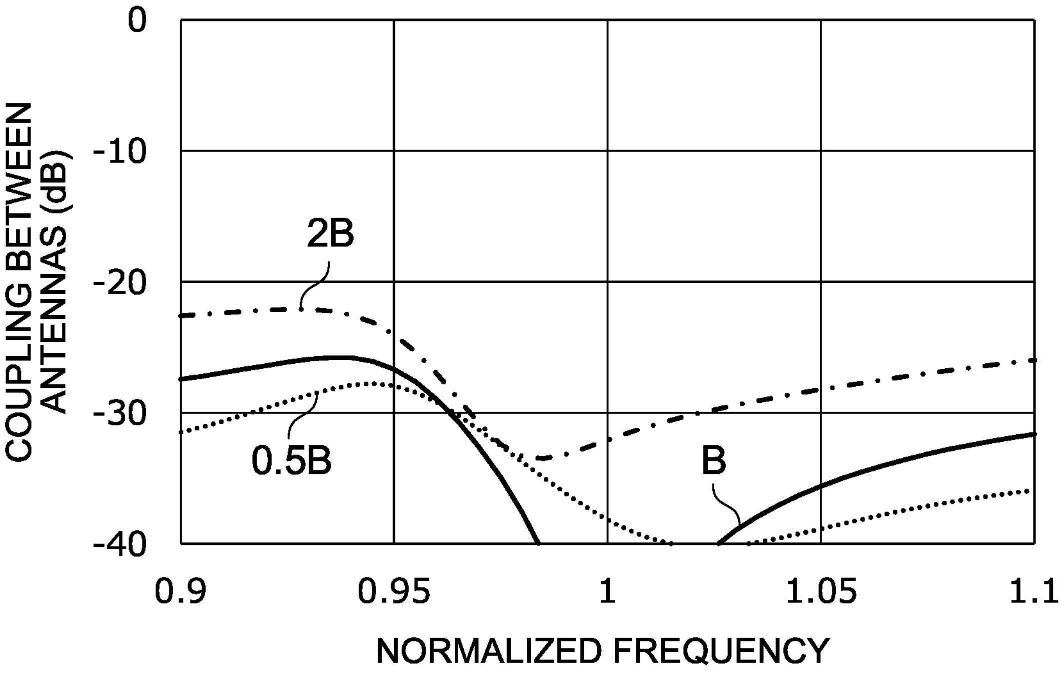
FIG. 7 is a diagram illustrating the frequency characteristics of coupling between the antennas when a susceptance of the susceptance element of the decoupling circuit according to the first embodiment is changed.

FIG. 7 is a diagram to explain frequency characteristics of coupling between the antennas in a case where the susceptance "B" of the susceptance element 103 is changed from the value derived from the expression (6), in the decoupling circuit 100 in FIG. 1. As the reactance "X" of the reactance element 102, the value derived from the expression (5) is used.

A graph B represents frequency characteristics in a case where the value derived from the expression (6) is used as the susceptance "B" of the susceptance element 103. A graph 0.5B represents frequency characteristics in a case where a value that is 0.5 times of the value derived from the expression (6) is used as the susceptance "B" of the susceptance element 103. A graph 2B represents frequency characteristics in a case where a value that is two times of the value derived from the expression (6) is used as the susceptance "B" of the susceptance element 103. As illustrated in FIG. 7, even in the case where the value that is 0.5 times or two times of the susceptance "B" derived from the expression (6) is used, coupling between the antennas at the center frequency is small, namely, −32 dB or less.

As can be understood from FIG. 6 and FIG. 7, the reactance "X" of the reactance element 102 and the susceptance "B" of the susceptance element 103 in the decoupling circuit 100 do not necessarily have to be identical to the value derived from the expression (5) and the value derived from the expression (6), respectively. Even when the values deviated from the values derived from the expression (5) and the expression (6) such as values that are 0.5 times or two times of the values derived from the expression (5) and the expression (6) are used, coupling between the antennas can be reduced.

Likewise, the reactance "X" of the reactance element 102 and the susceptance "B" of the susceptance element 103 in the decoupling circuit 110 in FIG. 4 do not necessarily have to be identical to the value derived from the expression (7) and the value derived from the expression (8), respectively. Even when the values separated from the values derived from the expression (7) and the expression (8) such as values that are 0.5 times or two times of the values derived from the expression (7) and the expression (8) are used, coupling between the antennas can be reduced.

FIG. 8 is a diagram to explain an effect of reducing coupling between the first radiating element 101*a* and the second radiating element 101*b* according to the present embodiment. The values determined by the above-described method are set as the reactance of the reactance element 102 and the susceptance of the susceptance element 103.

Figure 8A:
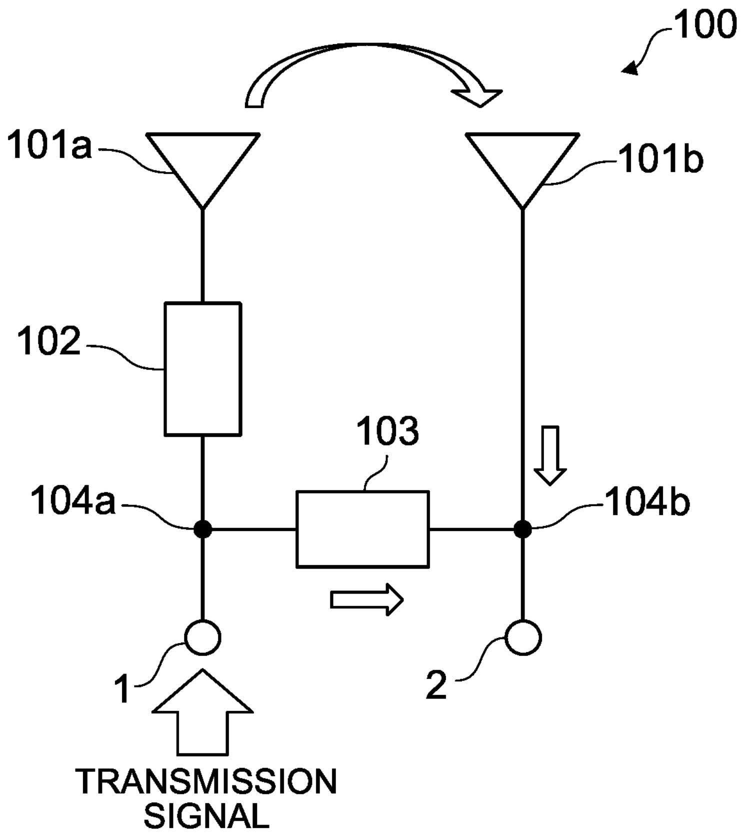
FIGS. 8A and 8B each is a diagram to explain an effect obtained by the decoupling circuit according to the first embodiment.

As a result, in a case where a transmission signal is transmitted from the port 1 by using the first radiating element 101*a* as illustrated in FIG. 8A, a signal input from the first radiating element 101*a* to the second radiating element 101*b* through coupling (electromagnetic coupling) and a signal input from the second end of the reactance element 102 (first circuit element) to the one end of the second radiating element 101*b* through the susceptance element 103 (second circuit element) are at least partially cancelled. More specifically, when amplitudes of both signals are equal to each other or a difference between the amplitudes of both signals is within an allowable range, and a phase difference is 180 degrees or within an allowable range, both signals are at least partially cancelled. As a result, coupling from the first radiating element 101*a* to the second radiating element 101*b* is reduced.

Figure 8B:
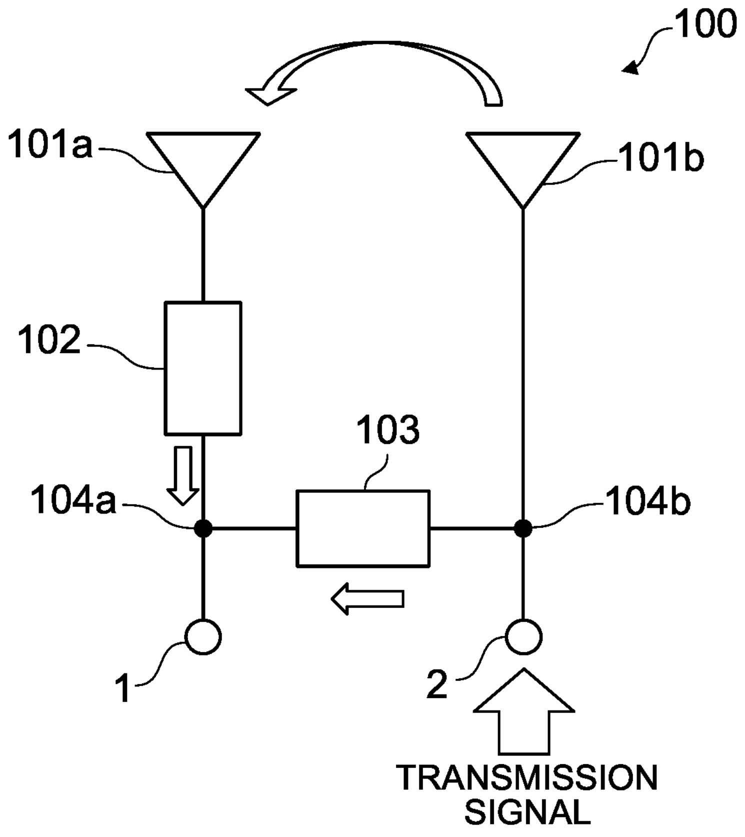

Likewise, in a case where a transmission signal is transmitted from the port 2 by using the second radiating element 101*b* as illustrated in FIG. 8B, a signal input from the second radiating element 101*b* to the first radiating element 101*a* through coupling and a signal input from the one end of the second radiating element 101*b* to the second end of the reactance element 102 (first circuit element) through the susceptance element 103 (second circuit element) are at least partially cancelled. More specifically, when amplitudes of both signals are equal to each other or a difference between the amplitudes of both signals is within an allowable range, and a phase difference is 180 degrees or within an allowable range, both signals are at least partially cancelled. As a result, coupling from the second radiating element 101*b* to the first radiating element 101*a* is reduced.

As described above, according to the present embodiment, only two circuit elements are used to reduce coupling between the first radiating element 101*a* and the second radiating element 101*b*, and the reactance and the susceptance of the two circuit elements are set by the above-described method. This makes it possible to reduce coupling between the first radiating element 101*a* and the second radiating element 101*b* while simplifying the configuration of the decoupling circuit. Accordingly, it is possible to suppress reduction of the realized gains of the antennas, and to improve the frequency characteristics. Further, in a case where the chip components are used for the circuit elements, the work to adjust the circuit constants (reactance, susceptance, or the like) of the circuit elements is facilitated. Furthermore, it is possible to reduce the manufacturing cost of the decoupling circuit.

Second Embodiment

Figure 9:
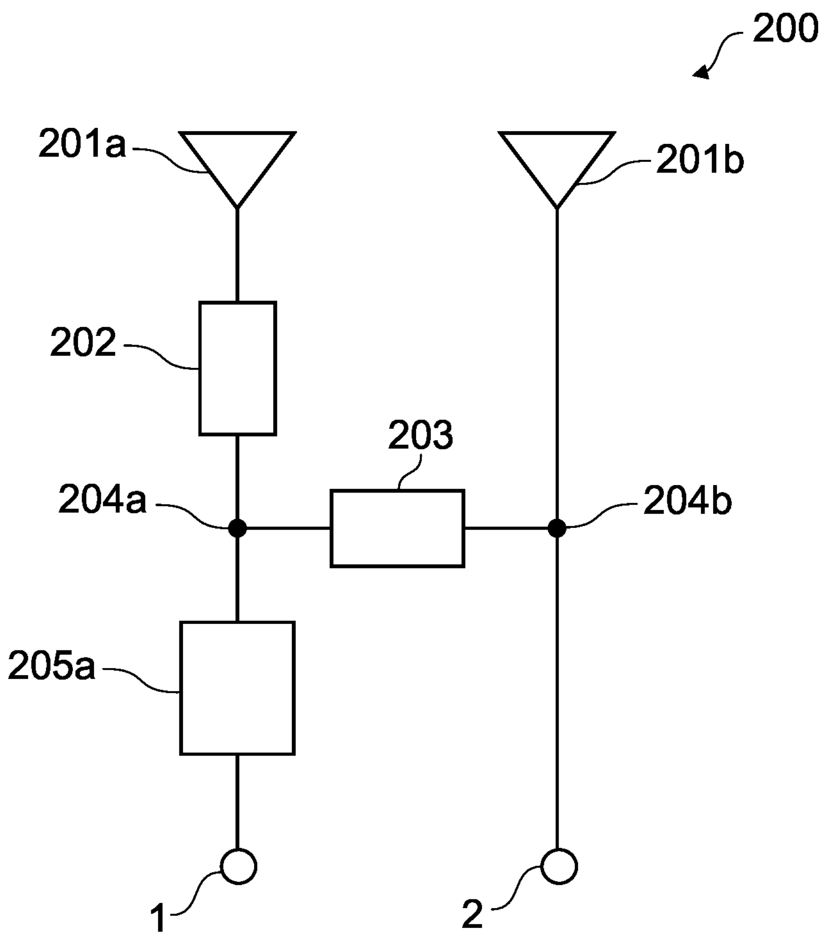
FIG. 9 is a diagram illustrating a configuration example of a decoupling circuit according to a second embodiment.

FIG. 9 is a diagram illustrating a configuration of a decoupling circuit 200 according to a second embodiment. The decoupling circuit 200 further includes a first matching circuit 205*a* in addition to the decoupling circuit 100. The first matching circuit 205*a* is provided, which reduces (suppresses) reflection from a first radiating element 201*a*. As a result, a loss caused by mismatch can be reduced, which makes it possible to improve communication quality and the like. The first matching circuit 205*a* can be configured by, for example, one or more chip components.

Figure 10A:
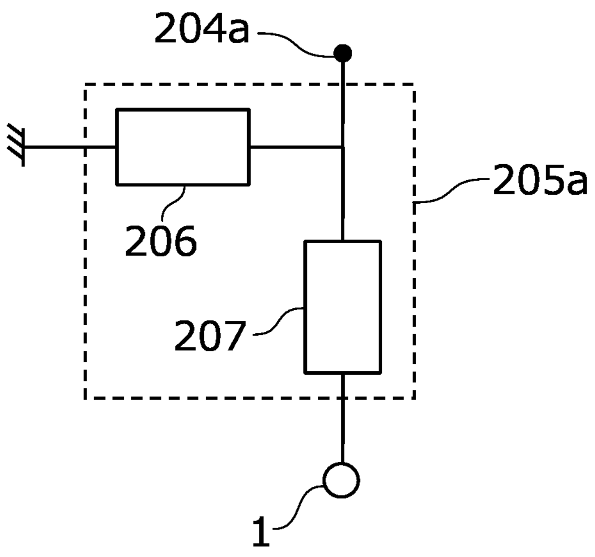
FIGS. 10A and 10B each is a diagram illustrating a configuration example of a first matching circuit.
Figure 10B:
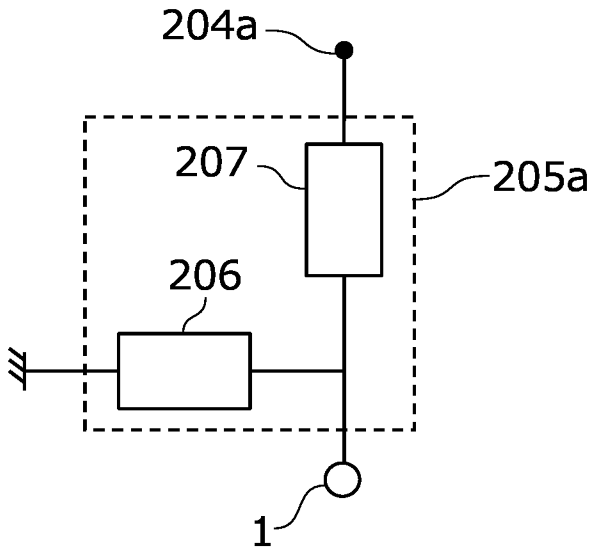

FIG. 10 illustrates specific examples of the first matching circuit 205*a*. As illustrated in FIG. 10A, the first matching circuit 205*a* is, for example, an L-type circuit including a susceptance element 206 and a reactance element 207. The L-type circuit is connected between a first connection point 204*a* and the port 1. One end of the reactance element 207 is connected to the first connection point 204*a*, and the other end of the reactance element 207 is connected to the port 1. One end of the susceptance element 206 is connected to the one end of the reactance element 207 on the first connection point 204*a* side. The other end of the susceptance element 206 is connected to a reference voltage. As illustrated in FIG. 10B, the one end of the susceptance element 206 in FIG. may be connected to the other end of the reactance element 207. The reactance element 207 is configured by a circuit element (fourth circuit element or sixth circuit element), and the susceptance element 206 is configured by a circuit element (third circuit element or fifth circuit element). The circuit element configuring the reactance element 207 and the circuit element configuring the susceptance element 206 may have the same configuration or different configurations.

For example, each of the susceptance element 206 and the reactance element 207 may be configured by the inductor in FIG. 2A described above, or may be configured by the capacitor in FIG. 2B. Each of the susceptance element 206 and the reactance element 207 may be configured by connecting the inductor and the capacitor in series as illustrated in FIG. 2C, or may be configured by connecting the inductor and the capacitor in parallel as illustrated in FIG. 2D. In a case where the reactance element 207 and the susceptance element 206 are the inductors, a chip component such as a chip inductor or a lead inductor may be used, or each of the inductors may be configured, for example, by the formation method using the substrate described above. One chip component including both of the susceptance element 206 and the reactance element 207 may be used.

Further, a plurality of matching circuits 205*a* in FIG. 10A or FIG. 10B connected in series may be used as the matching circuit 205*a* in FIG. 9. Connecting the plurality of matching circuits 205*a* in FIG. 10A or FIG. 10B in series makes it possible to suppress reflection from the first radiating element 201*a* in a broad frequency range. The first matching circuit may not be the L-type circuit, and may be configured by a H-type circuit, a T-type circuit, a stub, or the like.

Figure 11:
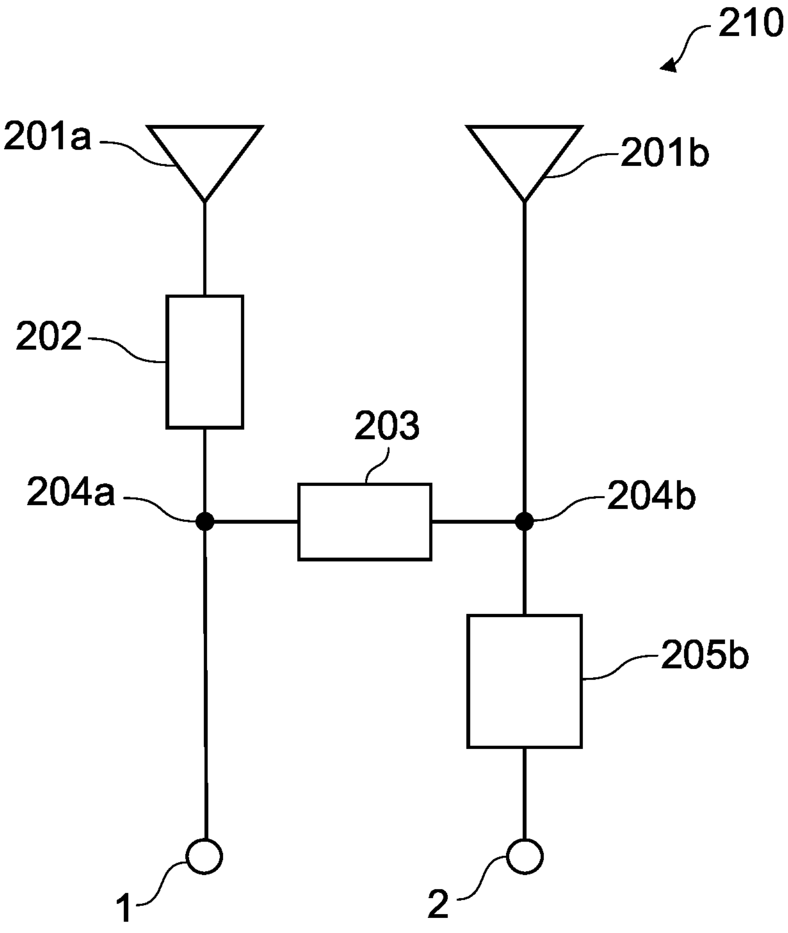
FIG. 11 is a diagram illustrating another configuration example of the decoupling circuit according to the second embodiment.

FIG. 11 is a diagram illustrating a modification 210 of the decoupling circuit 200. The decoupling circuit 210 includes a second matching circuit 205*b* connected between a second connection point 204*b* and the port 2. The second matching circuit 205*b* is provided, which makes it possible to suppress reflection from a second radiating element 201*b*. The configuration of the second matching circuit 205*b* may be similar to the configuration of the first matching circuit 205*a* (see FIG. 10).

Figure 12:
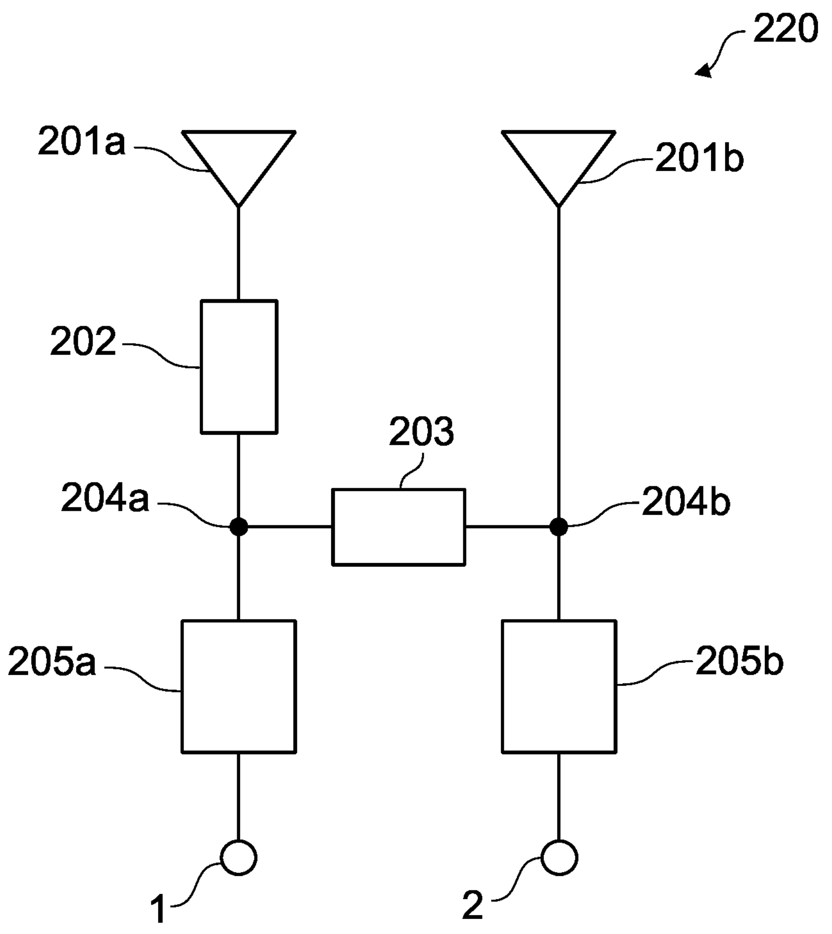
FIG. 12 is a diagram illustrating still another configuration example of the decoupling circuit according to the second embodiment.

FIG. 12 is a diagram illustrating a modification 220 of the decoupling circuit 200. The decoupling circuit 220 includes both of the first matching circuit 205*a* and the second matching circuit 205*b*. Both of the first matching circuit 205*a* and the second matching circuit 205*b* are provided, which makes it possible to suppress reflection from the first radiating element 201*a* and reflection from the second radiating element 201*b*.

Third Embodiment

Figure 13:
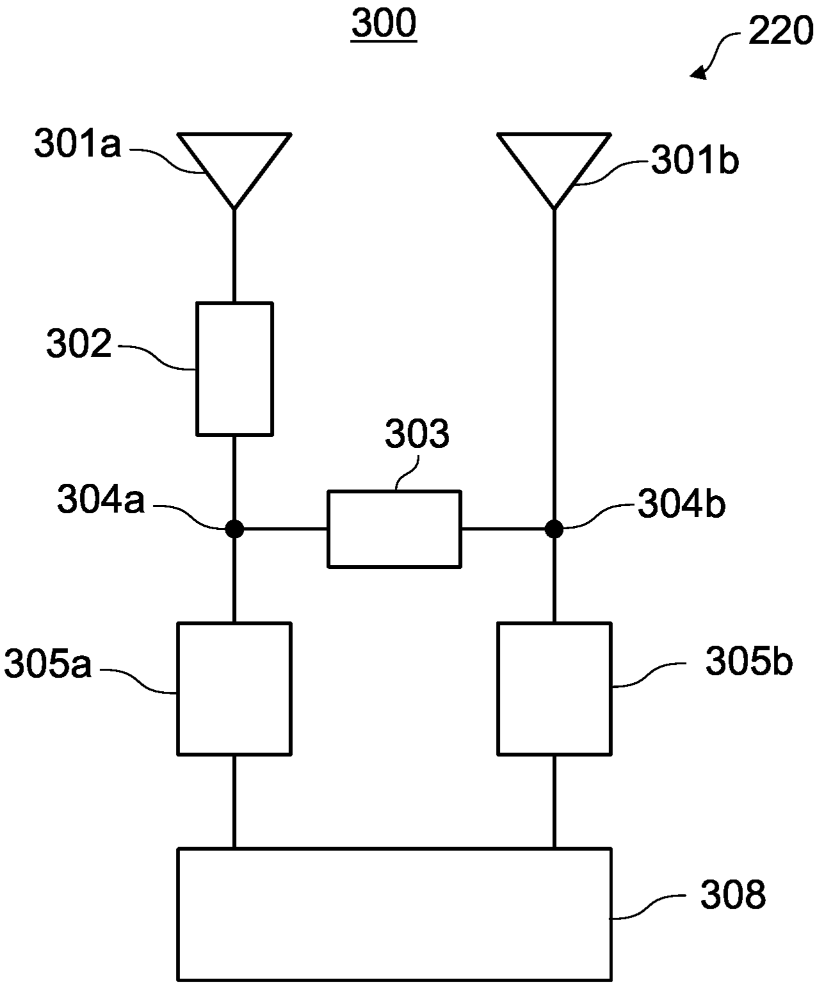
FIG. 13 is a diagram illustrating a configuration example of a wireless device according to a third embodiment.

FIG. 13 is a diagram illustrating a configuration of a wireless device 300 according to a third embodiment. The wireless device 300 further includes a wireless circuit 308 in addition to the decoupling circuit 220 illustrated in FIG. 12.

For example, the wireless device 300 can radiate and receive electromagnetic waves through a first radiating element 301*a* and a second radiating element 301*b*, and can perform communication with the other wireless communication device.

In a case where the wireless device 300 performs wireless communication with the other wireless communication device, the wireless circuit 308 generates, as a radio signal, a high-frequency signal used for the wireless communication. The wireless circuit 308 modulates the radio signal, and supplies the modulated signal to the first radiating element 301*a* and the second radiating element 301*b*, thereby radiating radio waves to a space. Further, radio waves from the other wireless communication device are received by the first radiating element 301*a* and the second radiating element 301*b*, and high-frequency signals as radio signals are supplied to the wireless circuit 308. The wireless circuit 308 acquires data from the other wireless communication device by demodulating the supplied high-frequency signals. The wireless device 300 may perform the wireless communication by selecting one of the first radiating element 301*a* or the second radiating element 301*b* based on a propagation environment and the like, or may perform the wireless communication by multiplying each of the high-frequency signals of the first radiating element 301*a* and the second radiating element 301*b* by a weight coefficient.

Figure 14:
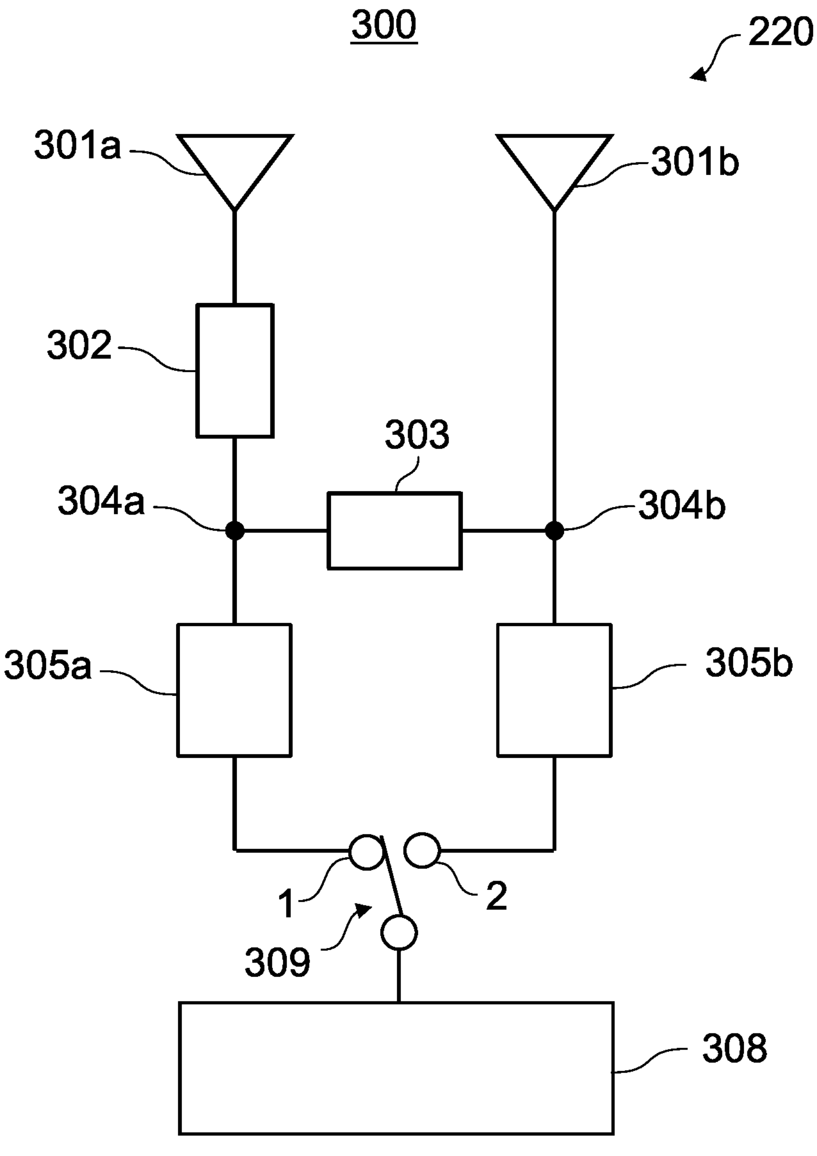
FIG. 14 is a diagram illustrating another configuration of the wireless device according to the third embodiment.

The wireless communication may be performed using one of the first radiating element 301*a* or the second radiating element 301*b*. FIG. 14 illustrates a configuration example of the wireless device in this case.

FIG. 14 illustrates an example in which the wireless circuit 308 is provided with a switch. A switch 309 is selectively connected to one of the port 1 or the port 2. To use the first radiating element 301*a*, the wireless circuit 308 connects the switch 309 to the port 1, whereas to use the second radiating element 301*b*, the wireless circuit 308 connects the switch 309 to the port 2.

The wireless device 300 may perform sensing by using the first radiating element 301*a* and the second radiating element 301*b*. For example, the wireless device 300 irradiates a measurement object with electromagnetic waves radiated from the first radiating element 301*a* and the second radiating element 301*b*, receives electromagnetic waves reflected by the measurement object by the first radiating element 301*a* and the second radiating element 301*b*, thereby estimating a position, a shape, a moving speed, and the like of the measurement object.

In a case where the wireless device 300 performs sensing of the measurement object, the wireless circuit 308 generates, as a measurement signal, a high-frequency signal used for the sensing. The wireless circuit 308 radiates radio waves to the space by supplying the measurement signal to the first radiating element 301*a* and the second radiating element 301*b*. At this time, the wireless circuit 308 may modulate the high-frequency signal or may not modulate the high-frequency signal. The wireless circuit 308 may multiply the high-frequency signal to be supplied to the first radiating element 301*a* and the second radiating element 301*b* by a weight coefficient. Reflected waves from the measurement object are received by the first radiating element 301*a* and the second radiating element 301*b*, and the high-frequency signals are supplied to the wireless circuit 308. The wireless circuit 308 may estimate at least one of the position, the shape, the moving speed, or the like of the measurement object based on at least one of power, a phase, a frequency, or the like of the high-frequency signal received from the first radiating element 301*a* and the second radiating element 301*b*.

The sensing may be performed using one of the first radiating element 301*a* or the second radiating element 301*b*. In this case, the wireless circuit 308 may include a switch selectively connected to one of the port 1 or the port 2. A configuration example of the wireless device may be similar to the configuration in FIG. 14.

Further, the wireless device 300 may generate power by using the electromagnetic waves received by the first radiating element 301*a* and the second radiating element 301*b*. For example, the wireless circuit 308 rectifies the received electromagnetic waves, stores the rectified electromagnetic waves in a storage battery, or provides the rectified electromagnetic waves to an electronic device as power. The wireless device 300 may use one of the first radiating element 301*a* or the second radiating element 301*b* to receive the electromagnetic waves, and generate power. In this case, the wireless circuit 308 may include a switch selectively connected to one of the port 1 or the port 2. A configuration example of the wireless device may be similar to the configuration in FIG. 14.

Applicable Technical Field

The present embodiment is applicable to a wireless device mounted with a plurality of antennas. In particular, in a small wireless device, characteristics of antennas are changed due to proximity of a plurality of antennas, and communication quality and the like of wireless communication are deteriorated by electromagnetic coupling between the antennas. Using the decoupling circuit according to the present embodiment makes it possible to reduce coupling between the antennas, and to improve communication quality and the like. Since the decoupling circuit according to the present embodiment uses only two circuit elements, adjustment of circuit constants is easily performable, and a manufacturing cost can be reduced.

While certain embodiment have been described, these embodiment have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The embodiments as described before may be configured as below.

Clauses

Clause 1. Electronic circuitry, comprising:
- a first radiating element;
- a second radiating element;
- a first circuit element including a first end and a second end, the first end being connected to one end of one of the first radiating element or the second radiating element; and
- a second circuit element connected between the second end of the first circuit element and one end of another of the first radiating element or the second radiating element.

Clause 2. The electronic circuitry according to Clause 1, wherein a reactance or a susceptance of the first circuit element and a reactance or a susceptance of the second circuit element are respectively set to values at which
- a signal input from the one radiating element to the other radiating element through electromagnetic coupling and a signal input from the second end of the first circuit element to the one end of the other radiating element through the second circuit element are at least partially cancelled, and
- a signal input from the other radiating element to the one radiating element through electromagnetic coupling and a signal input from the one end of the other radiating element to the second end of the first circuit element through the second circuit element are at least partially cancelled.

Clause 3. The electronic circuitry according to Clause 1 or 2, wherein each of the first circuit element and the second circuit element includes a coil, a capacitor, series connection of a coil and a capacitor, or parallel connection of a coil and a capacitor.

Clause 4. The electronic circuitry according to any one of Clauses 1 to 3, wherein the first circuit element and the second circuit element are chip components.

Clause 5. The electronic circuitry according to any one of Clauses 1 to 4, further comprising a first matching circuit connected to the second end of the first circuit element and configured to reduce a reflected wave from the one radiating element.

Clause 6. The electronic circuitry according to Clause 5, wherein
- the first matching circuit at least includes a third circuit element and a fourth circuit element,
- the fourth circuit element includes one end connected to the second end of the first circuit element, and
- the third circuit element includes one end connected to the one end or another end of the fourth circuit element, and includes another end connected to a reference voltage.

Clause 7. The electronic circuitry according to Clause 5 or 6, wherein the first matching circuit includes one or more chip components.

Clause 8. The electronic circuitry according to any one of Clauses 1 to 7, further comprising a second matching circuit connected to the one end of the other radiating element, and configured to reduce a reflected wave from the other radiating element.

Clause 9. The electronic circuitry according to Clause 8, wherein the second matching circuit at least includes a fifth circuit element and a sixth circuit element;

the sixth circuit element includes one end connected to the one end of the other radiating element, and the fifth circuit element includes one end connected to the one end or another end of the sixth circuit element, and includes another end connected to a reference voltage.

Clause 10. The electronic circuitry according to Clause 8 or 9, wherein the second matching circuit includes one or more chip components.

Clause 11. The electronic circuitry according to any one of Clauses 1 to further comprising:

a first matching circuit connected to the second end of the first circuit element and configured to reduce reflected waves from the one radiating element; and a second matching circuit connected to the one end of the other radiating element and configured to reduce reflected waves from the other radiating element.

Clause 12. The electronic circuitry according to Clause 11, wherein the first matching circuit at least includes a third circuit element and a fourth circuit element, the fourth circuit element includes one end connected to the second end of the first circuit element, the third circuit element includes one end connected to the one end or another end of the fourth circuit element, and includes another end connected to a reference voltage, the second matching circuit at least includes a fifth circuit element and a sixth circuit element, the sixth circuit element includes one end connected to the one end of the other radiating element, and the fifth circuit element includes one end connected to the one end or another end of the sixth circuit element, and includes another end connected to the reference voltage.

Clause 13. The electronic circuitry according to Clause 11 or 12, wherein each of the first matching circuit and the second matching circuit includes one or more chip components.

Clause 14. The electronic circuitry according to any one of Clauses 1 to 13, further comprising a wireless circuit connected to the second end of the first circuit element and one end of the other radiating element.

Clause 15. The electronic circuitry according to Clause 14, further comprising a switch configured to selectively connect the wireless circuit to the second end of the first circuit element or the one end of the other radiating element.

Clause 16. The electronic circuitry according to Clause 14 or 15, wherein the wireless circuit is configured to perform sensing of a measurement object by transmitting a measurement signal to the measurement object through at least one of the first radiating element and the second radiating element, and receiving a reflection signal from the measurement object through at least one of the first radiating element and the second radiating element.

Clause 17. The electronic circuitry according to any one of Clauses 14 to 16, wherein the wireless circuit performs wireless communication with another wireless communication device by transmitting/receiving a radio signal through at least one of the first radiating element and the second radiating element.

The invention claimed is:

1. Electronic circuitry, comprising:

a first radiating element;

a second radiating element;

a first circuit element including a first end and second end, the first end being connected to one end of one of the first radiating element or the second radiating element; and a second circuit element connected between the second end of the first circuit element and one end of another of the first radiating element or the second radiating element, wherein no other circuit element is provided between the second circuit element and the one end of the other of the first radiating element or the second radiating element and, a reactance of the first circuit element is in a range of 0.5 to 2 times a value of X in the following equation, $$X=\frac{-(R_{12}^2+X_{12}^2)R_{21}+(R_{11}R_{12}+X_{11}X_{12})R_{22}+(R_{11}X_{12}-X_{11}R_{12})X_{22}}{R_{12}X_{22}+X_{12}R_{22}}$$

a susceptance of the second circuit element is in a range of 0.5 to 2 times a value of B in the following equation, $$B=\mathrm{Im}\left[\frac{-Z_{12}}{(Z_{11}+jX)Z_{22}-Z_{12}Z_{21}}\right]$$

$$[Z]=\begin{bmatrix}Z_{11} & Z_{12}\\ Z_{21} & Z_{22}\end{bmatrix}=\begin{bmatrix}R_{11} & +jX_{11} & R_{12} & +jX_{12}\\ R_{21} & +jX_{21} & R_{22} & +jX_{22}\end{bmatrix}$$

$Z_{11}$ is an input impedance of the first radiating element, $Z_{22}$ is an input impedance of the second radiating element, $Z_{21}$ and $Z_{12}$ each are a mutual impedance between the first radiating element and the second radiating element, $R_{11}$, $R_{12}$, $R_{21}$ and $R_{22}$ are real parts, and $X_{11}$, $X_{12}$, $X_{21}$ and $X_{22}$ are imaginary parts.

2. The electronic circuitry according to claim 1, wherein a reactance or a susceptance of the first circuit element and a reactance or a susceptance of the second circuit element are respectively set to values at which a signal input from the one radiating element to the other radiating element through electromagnetic coupling and a signal input from the second end of the first circuit element to the one end of the other radiating element through the second circuit element are at least partially cancelled, and a signal input from the other radiating element to the one radiating element through electromagnetic coupling and a signal input from the one end of the other radiating element to the second end of the first circuit element through the second circuit element are at least partially cancelled.

3. The electronic circuitry according to claim 1, wherein each of the first circuit element and the second circuit element includes a coil, a capacitor, series connection of a coil and a capacitor, or parallel connection of a coil and a capacitor.

4. The electronic circuitry according to claim 1, wherein the first circuit element and the second circuit element are chip components.

5. The electronic circuitry according to claim 1, further comprising a first matching circuit connected to the second end of the first circuit element and configured to reduce a reflected wave from the one radiating element.

6. The electronic circuitry according to claim 5, wherein the first matching circuit at least includes a third circuit element and a fourth circuit element, the fourth circuit element includes one end connected to the second end of the first circuit element, and the third circuit element includes one end connected to the one end or another end of the fourth circuit element, and includes another end connected to a reference voltage.

7. The electronic circuitry according to claim 5, wherein the first matching circuit includes one or more chip components.

8. The electronic circuitry according to claim 1, further comprising a second matching circuit connected to the one end of the other radiating element, and configured to reduce a reflected wave from the other radiating element.

9. The electronic circuitry according to claim 8, wherein the second matching circuit at least includes a fifth circuit element and a sixth circuit element;

the sixth circuit element includes one end connected to the one end of the other radiating element, and the fifth circuit element includes one end connected to the one end or another end of the sixth circuit element, and includes another end connected to a reference voltage.

10. The electronic circuitry according to claim 8, wherein the second matching circuit includes one or more chip components.

11. The electronic circuitry according to claim 1, further comprising:

a first matching circuit connected to the second end of the first circuit element and configured to reduce reflected waves from the one radiating element; and a second matching circuit connected to the one end of the other radiating element and configured to reduce reflected waves from the other radiating element.

12. The electronic circuitry according to claim 11, wherein the first matching circuit at least includes a third circuit element and a fourth circuit element, the fourth circuit element includes one end connected to the second end of the first circuit element, the third circuit element includes one end connected to the one end or another end of the fourth circuit element, and includes another end connected to a reference voltage, the second matching circuit at least includes a fifth circuit element and a sixth circuit element, the sixth circuit element includes one end connected to the one end of the other radiating element, and the fifth circuit element includes one end connected to the one end or another end of the sixth circuit element, and includes another end connected to the reference voltage.

13. The electronic circuitry according to claim 11, wherein each of the first matching circuit and the second matching circuit includes one or more chip components.

14. The electronic circuitry according to claim 1, further comprising a wireless circuit connected to the second end of the first circuit element and one end of the other radiating element.

15. The electronic circuitry according to claim 14, further comprising a switch configured to selectively connect the wireless circuit to the second end of the first circuit element or the one end of the other radiating element.

16. The electronic circuitry according to claim 14, wherein the wireless circuit is configured to perform sensing of a measurement object by transmitting a measurement signal to the measurement object through at least one of the first radiating element and the second radiating element, and receiving a reflection signal from the measurement object through at least one of the first radiating element and the second radiating element.

17. The electronic circuitry according to claim 14, wherein the wireless circuit performs wireless communication with another wireless communication device by transmitting/receiving a radio signal through at least one of the first radiating element and the second radiating element.

* * * * *